United States Patent [19]

Steklenski et al.

[11] Patent Number: 4,735,976

[45] Date of Patent: * Apr. 5, 1988

[54] PROTECTIVE OVERCOAT FOR PHOTOGRAPHIC ELEMENTS

[75] Inventors: David J. Steklenski, Rochester; Philip L. Keogh, Pittsford, both of N.Y.

[73] Assignee: Eastman Kodak Company, Rochester, N.Y.

[ * ] Notice: The portion of the term of this patent subsequent to Sep. 25, 2001 has been disclaimed.

[21] Appl. No.: 875,796

[22] Filed: Jun. 18, 1986

Related U.S. Application Data

[62] Division of Ser. No. 757,701, Jul. 22, 1985, Pat. No. 4,612,279.

[51] Int. Cl.⁴ ........................... C08L 1/20; G03C 1/78

[52] U.S. Cl. ........................................ 524/32

[58] Field of Search ........................ 524/32, 31

[56] References Cited

U.S. PATENT DOCUMENTS

| | | | |
|---|---|---|---|
| 4,025,338 | 5/1977 | Miyatuka et al. | 96/1 R |
| 4,431,727 | 2/1984 | Steklenski | 430/528 |
| 4,473,676 | 9/1984 | Steklenski | 524/32 |

*Primary Examiner*—Delbert R. Phillips
*Assistant Examiner*—Nathan M. Nutter
*Attorney, Agent, or Firm*—John R. Everett

[57] ABSTRACT

A polymer blend comprising cellulose nitrate and a polymer characterized in that (a) the polymer comprises at least 70 weight percent of polymerized recurring units derived from a hydrophobic monomer selected from the group consisting of styrene, alkyl acrylates and alkyl methacrylates and 10 to 24 weight percent of polymerized recurring units derived from an acid monomer selected from the group consisting of methacrylic acid and acrylic acid; and (b) the blend comprises from 20 to 70 weight percent of cellulose nitrate and from 8 to 15 weight percent of the polymerized recurring acid monomer and is useful as a protective layer in radiation-sensitive elements.

4 Claims, No Drawings

PROTECTIVE OVERCOAT FOR PHOTOGRAPHIC ELEMENTS

This is a division of application Ser. No. 757,701, filed July 22, 1985, and now U.S. Pat. No. 4,612,279.

The present invention relates to a blend comprising a cellulose nitrate and an acrylate polymer and the use of such blend as a protective layer in radiation-sensitive photographic elements.

BACKGROUND OF THE INVENTION

Protective coatings for radiation-sensitive elements, especially silver halide layers are well known. Protective coatings have been formulated for both the radiation-sensitive side of the element and the other side of the element. This other side is commonly referred to in the art as the support side or the base side of the element. These coatings are designed to provide a variety of properties such as resistance to abrasion and resistance to solvent attack.

Certain photographic elements have further requirements which must be met by the base side protective overcoat. For example, the base side of the photographic element is often coated with an antistatic layer. The protective coating is applied over the antistatic layer. Frequently, chemicals in a photographic processing solution or in the environment are capable of reacting with the conductive compound in the antistatic layer, thus causing the antistatic layer to lose much of its conductivity. Thus, a protective layer for an element having a base side antistatic layer must be capable of chemically isolating the antistatic layer.

In many photographic processing sequences, the final step is a so-called stabilization step. The solution used in this step varies from process to process. In almost all cases the solution contains a surfactant designed to provide excellent wetting of the emulsion side of the film. Polymeric protective layers such as disclosed in U.S. Pat. No. 4,431,727 comprises a compatible blend of (a) cellulose nitrate and (b) a hydrophobic polymer wherein the hydrophobic polymer has a glass transition temperature of at least about 50° C. The layers are highly hydrophobic. When the stabilizing solution evaporates, a deposit of the surfactant in the form of an objectionable surface haze or scum appears on the protective layer.

STATEMENT OF THE INVENTION

We have discovered that such objectionable surface haze or scum can be eliminated by using as the protective layer in radiation-sensitive elements, especially silver halide radiation-sensitive elements, a polymer blend comprising cellulose nitrate and a polymer characterized in that (a) the polymer comprises at least 70 weight percent polymerized recurring units from a hydrophobic monomer selected from the group consisting of styrene, alkyl acrylates and alkyl methacrylates; 10 to 24, preferably 10 to 20 weight percent of recurring units derived from an acid monomer selected from the group consisting of acrylic acid and methacrylic acid; and (b) the blend comprises from 20 to 70 weight percent of cellulose nitrate and from 8 to 15 weight percent of the polymerized recurring acid monomer.

It is necessary to have at least 70 weight percent of the recurring hydrophobic monomers to make the polymer sufficiently hydrophobic to avoid softening during processing. It is necessary to have at least 10 weight percent of acid monomers because this provides sufficient hydrophobic properties to the overcoat surface to prevent scumming by the surfactant in processing solutions. Photomicrographs show that the scum on prior art overcoats consists of numerous myriad minute droplets. It is believed that the new, more hydrophobic overcoats allow such uniform wetting by processing solutions that, on drying, minimal, or no such droplets (scum) form. More than 24 weight percent of the acid monomers would cause rhe layer to soften in alkaline processing solutions. More than 70 weight percent of cellulose nitrate in the blend and the resultant layer is contaminated with stain and scum. If less than 20 weight percent of cellulose nitrate is used, softening of the layer occurs during processing.

In a preferred embodiment of the invention, the protective layer comprises a polymer blend wherein the hydrophobic monomer is selected from the group consisting of styrene, methyl methacrylate, ethyl acrylate and butyl acrylate; the acid monomer is methacrylic acid and the blend comprises from 9 to 12 weight percent recurring methacrylic acid monomer with the balance being cellulose nitrate.

DETAILS OF THE INVENTION

Cellulose nitrate is the reaction product of cellulose with nitric acid. Cellulose is composed of a large number of $\beta$-anhydroglucose units. The glucose units have three hydroxyl groups and are joined together by $\beta$-glucoside linkages. Various grades of cellulose nitrate are characterized by the degree of substitution by nitro groups of the hydroxyl groups in the anhydroglucose units and by the degree of polymerization. Cellulose nitrates which are useful in the present invention include any of a wide variety of cellulose nitrates including those which are commercially available. Useful cellulose nitrates include RS• cellulose nitrates, as well as AS• and SS• cellulose nitrates sold by Hercules. RS• cellulose nitrate, for example, has a nominal degree of substitution which corresponds to a nitrogen content of about 12 percent. The viscosity of a particular cellulose nitrate is related to its degree of polymerization and is expressed in terms of either centipoise or the time, expressed in seconds for a metal ball of specified size and density to fall through a measured distance in a solution of the cellulose nitrate. For the purposes of the present specification, the viscosity in seconds is the time required for a 1/32-inch (0.08 cm) steel ball to fall 2 inches (5.08 cm) in a 12.2 percent solution of the cellulose nitrate in acetone at 25° C. This corresponds to the ASTM D1343-56 procedure. Reference is made to H. M. Sperlin et al, "Cellulose and Cellulose Derivatives", *High Polymers,* Vol. V, 2nd Edition, part 3, Interscience, New York, 1955.

The other component of the compatible polymer blend of the layers of the present invention is the polymer.

The polymers which are used in the blends of the present invention must be sufficiently hydrophobic to avoid becoming soft during processing in alkaline solutions, ferrotyping and base-side to emulsion-side blocking and sticking. This requirement is met by maintaining at least 70 weight percent of the polymerized recurring hydrophobic monomers in the polymer. This amount of hydrophobic monomer in the polymer is sufficient to maintain a glass transition temperature of at least 40° C. in layers formed from the blends. By "hydrophobic" is meant substantially water-insoluble and substantially not swellable in water. Useful monomers are styrene, alkyl acrylates and alkyl methacrylates. Examples of such monomers include methyl methacrylate, butyl acrylate and ethyl acrylate.

However, a certain level of polymerized hydrophilic monomer must be included into the polymer to avoid the formation of the objectionable scum and haze in the photographic element. This requirement is generally met by maintaining from 10 to 24 weight percent of the acid monomer in the polymer. Useful acid monomers include methacrylic acid and acrylic acid.

In some cases from 0 to 5 weight percent of other polymerized hydrophilic monomers may be included in the polymer to fine tune the hydrophilic properties of the polymer. When other hydrophilic monomers are used the amount of acid monomer should be lowered to prevent the layer from becoming too hydrophilic. Useful monomers in this regard include acrylamide, methacrylamide, hydroxyethyl methacrylate and hydroxyethyl acrylate.

Methods of making the polymers used in the blends of this invention are well known. Such methods include bulk, emulsion, solution and suspension polymerization methods. These techniques are generally described in W. R. Sorenson & T. W. Campbell, "Preparative Methods of Polymer Chemistry", 2nd Edition, (1968), Wiley, N.Y. and M. P. Stevens, "Polymer Chemistry, an Introduction", Addison Wesley Pub., Co., Inc. (1975), London.

Useful polymers include:

TABLE I

| | | Weight Ratio |
|---|---|---|
| 1. | poly(methyl methacrylate-co-methacrylic acid) | 90/10 |
| 2. | poly(methyl methacrylate-co-methacrylic acid) | 85/15 |
| 3. | poly(methyl methacrylate-co-methacrylic acid) | 79/21 |
| 4. | poly(methyl methacrylate-co-methacrylic acid) | 75/25 |
| 5. | poly(methyl methacrylate-co-methacrylic acid) | 70/30 |
| 6. | poly(ethyl methacrylate-co-methacrylic acid) | 80/20 |
| 7. | poly(butyl acrylate-co-methyl methacrylate-co-methacrylic acid) | 20/65/15 |
| 8. | poly(styrene-co-methyl methacrylate-co-methacrylic acid) | 20/65/15 |
| 9. | poly(methyl methacrylate-co-2-hydroxyethyl methacrylate-co-methacrylic acid) | 85/2/13 |

The protective overcoat layers of the present invention are coated from a solvent solution of the polymers. The solvent chosen is capable of dissolving both components of the blend. Frequently, it is desirable to use a solvent mixture in order to adjust the viscosity of the coating composition, to economize on solvent cost or for some other purpose. Cellulose nitrate is soluble in a variety of solvents including ketones, esters, amides and nitroparaffins. Certain alcohols are also solvents for nitrocellulose, particularly when used in admixture with other solvents. Useful alcohol solvents include isopropanol and 2-methoxyethanol If a solvent mixture is used, the cosolvent is any of a wide variety of solvents. Useful cosolvents include acetone, ethyl acetate and methyl ethyl ketone. Useful diluents include liquid hydrocarbons, either aromatic or aliphatic, such as benzene, xylene, 1,1,1 TM trichloroethane, 1,2-dichloromethane and toluene.

The described polymer blends are coated to produce protective layers using any suitable method. For example, the compositions are coated by spray coating, fluidized bed coating, dip coating, doctor-blade coating or extrusion hopper coating.

The weight percent solids in the coating composition varies widely. The percent solids, along with the method of coating, substantially influences the coverage of the layer. A useful range for the weight percent solids in the coating composition depends on the specific members of the polymer blend and the solvents chosen and is generally between about 1 percent to about 10 percent.

As noted previously, the protective overcoat layers of the present invention are particularly useful over antistatic layers on the base side of a silver halide photographic element. Useful antistatic layers include those described in U.S. Pat. Nos. 3,399,995, 3,674,711 and 3,011,918 which relate to layers containing water-dispersible, particulate polymers. One particularly preferred antistatic layer is described in U.S. Pat. No. 4,070,189 which relates to the use of water-dispersible, particulate vinylbenzyl quaternary ammonium or phosphonium salt polymers. Another useful antistatic layer of this type is described in U.S. Pat. No. 4,294,739. Another class of particularly preferred antistatic layers consists of the polyaniline salt-containing layers described, for example, in U.S. Pat. Nos. 3,963,498 and 4,237,194.

As noted, a particularly useful antistatic composition is described in U.S. Pat. No. 4,070,189. Unlike many antistatic layers, the layers of this patent include hydrophobic binders. The overcoat layers of the present invention are preferably used with the antistatic layers of U.S. Pat. No. 4,070,189 because of the excellent adhesion of the layers to each other. The antistatic layers of this patent comprise an antistatic, crosslinked vinylbenzyl quaternary ammonium polymer in combination with a hydrophobic binder wherein the weight ratio of binder to antistatic crosslinked polymer is about 10:1 to 1:1. The antistatic highly crosslinked vinylbenzyl ammonium polymer includes polymers represented by the formula:

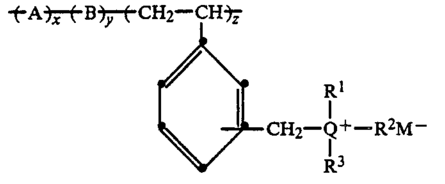

wherein:

A is a polymerized monomer containing at least two ethylenically unsaturated groups;

B is a polymerized copolymerizable, $\alpha,\beta$-ethylenically unsaturated monomer;

Q is N or P;

$R^1$, $R^2$ and $R^3$ are independently selected from the group consisting of carbocyclic, alkyl, aryl and aralkyl, and $R^1$, $R^2$ and $R^3$ together optionally form the atoms necessary to complete a heterocyclic ring with Q, such as pyridinium;

$M^-$ is an anion;

x is from about 0.1 to about 20 mole percent;

y is from about 0 to about 90 mole percent; and
z is from about 10 to about 90 mole percent.

The hydrophobic binder of the compositions described in U.S. Pat. No. 4,070,189 include cationic or neutral hydrophobic film-forming polymers such as acetylated cellulose, poly(methyl methacrylate), poly(ethyl acrylate), poly(styrene), poly(butyl methacrylate-co-styrene) (60:40), poly(vinyl acetal) and cellulose acetate butyrate.

A second preferred class of antistatic layer compositions includes a polyaniline salt semiconductor. Compositions of this type are described, for example, in U.S. Pat. Nos. 3,963,498 and 4,237,194. The compositions of U.S. Pat. No. 4,237,194 are particularly preferred because they exhibit high conductivity at low coverages of the semiconductor. The antistatic layer of this patent comprises a coalesced, cationically stabilized latex and a polyaniline acid addition salt semiconductor wherein the latex and the semiconductor are chosen so that the semiconductor is associated with the latex before coalescing. Particularly preferred latex binders include cationically stabilized, coalesced, substantially linear, polyurethanes.

In addition to the polymer blend as described, the protective layer of the present invention optionally contains other components. Useful components include plasticizers, waxes, matting agents, charge-control agents and dyes.

Photographic elements comprise a support having thereon at least one radiation-sensitive layer. The protective layer of the present invention is coated as the outermost layer on the base side of the photographic element. The other side of the photographic element, commonly referred to as the emulsion side, has as its outermost layer a hydrophilic layer. This hydrophilic layer is either the radiation-sensitive layer itself such as one containing silver halide or an overcoat layer which is hydrophilic so as to facilitate processing of the element. This outermost hydrophilic layer optionally contains a variety of addenda such as matting agents, antifoggants, plasticizers and haze-reducing agents. The outermost hydrophilic layer comprises any of a large number of water-permeable hydrophilic polymers. Typical hydrophilic polymers include gelatin, albumin, poly(vinyl alcohols) and hydrolyzed cellulose esters.

The photographic silver halide radiation-sensitive layers are well-known in the art. Such layers are more completely described in *Research Disclosure,* December, 1978, pages 22–31, Item 17643. *Research Disclosure* is published by Kenneth Mason Publications, Ltd., The Old Harbourmaster's, 8 North Street, Emsworth, Hampshire P010 7DD, England.

The photographic elements of the present invention include a photographic support. Useful supports include those described in paragraph XVII of the above-identified *Research Disclosure.* Particularly useful supports include cellulose acetate and poly(ethylene terephthalate).

The following examples are presented to illustrate the practice of the present invention.

EXAMPLE 1

A. Preparation of Coating Solutions and Coated Films

Coating solutions were prepared by dissolving Polymer 2, Table I and cellulose nitrate (RS ½ second grade, Hercules Inc.) in the amounts shown in Table II in a 45/55 volume mixture of acetone and 1,1,1-trichloroethane. The resulting solutions were then coated onto an uncoated acetate support and dried to give clear, continuous layers on the support.

TABLE II

| Solution Number | g. Polymer 2 Table I | g. Cellulose Nitrate | Wt. % Methacrylic Acid Constituent in Blend | Wt. % Cellulose Nitrate in Blend |
|---|---|---|---|---|
| 1 | 0.0 | 2.0 | 0.0 | 100.0 |
| 2 | 0.93 | 1.07 | 7.0 | 53.5 |
| 3 | 1.06 | 0.94 | 8.0 | 47.0 |
| 4 | 1.20 | 0.80 | 9.0 | 40.0 |
| 5 | 1.33 | 0.67 | 10.0 | 33.5 |
| 6 | 1.46 | 0.54 | 11.0 | 27.0 |
| 7 | 1.60 | 0.40 | 12.0 | 20.0 |

B. Evaluation for Haze and Scum After Processing

Samples of the layers prepared above were processed in C-41 photographic chemistry process by immersing the films in tanks of the processing solutions. The C-41 process is described in detail in pages 209–211 of the *British Journal Photographic Annual* (1982). After treatment with a C-41 stabilizer composition, the layers were hung to air-dry without rinsing or removal of the excess liquid. The dried layers were then evaluated visually for the appearance of haze or scum by both transmitted and reflected light.

| Layer No. | Wt. % Methacrylic Acid Constituent in Blend | Clarity |
|---|---|---|
| 1 | 0.0 | Moderate haze/scum |
| 2 | 7.0 | Slight haze/scum |
| 3 | 8.0 | Very slight haze/scum |
| 4 | 9.0 | Clear |
| 5 | 10.0 | Clear |
| 6 | 11.0 | Clear |
| 7 | 12.0 | Clear |

This data shows that the presence of at least 7 weight percent methacrylic acid in the blend and layer is required to improve the clarity of the layers and minimize scum.

C. Evaluation for Softening in the Developer

A concern with any acid-containing polymer or blend in a photographic system is the degree to which the material softens on exposure to an alkaline developer. The samples prepared above were soaked for 5 minutes in pH 10, C-41 developer at 105° F. (40.6° C.). They were then evaluated for softness and propensity for removal by scratching the surface of the coating with a fingernail. None of the blends showed any removal or tendency to soften.

EXAMPLE 2

Blends of cellulose nitrate, RS ½ second grade, were prepared using acrylate ester copolymers containing various amounts of methacrylic acid. In each case the blends were formulated by varying the copolymer to cellulose nitrate ratio so that the final composition contained 10% by weight of methacrylic acid. Coating solutions and layers were Prepared as in Example 1. The dried films were then examined for appearance after C-41 processing and for softness in the developer as described above.

| Polymer No. | Polymer to cellulose nitrate Ratio (wt.) | Post-Process Clarity | Softness in Developer |
|---|---|---|---|
| 2 | 2/1 | Excellent | Unaffected |
| 3 | 0.9/1 | Excellent | Unaffected |
| 4 | 0.66/1 | Excellent | Unaffected |
| 5 | 1/2 | Slight haze | Partially Removed |

EXAMPLE 3

Cellulose nitrate/acrylic copolymer layers as described in Example 1 (film no. 5) were coated as protective overcoats over antistatic compositions described in U.S. Pat. No. 4,070,189. The overcoat layers provided protection for the antistatic underlayer from the effect of photographic processing solutions. The overcoat layers were free of haze or scum after processing and showed no tendency toward softness or removal.

EXAMPLE 4

Blends of cellulose nitrate, RS ½ second grade, were prepared using a variety of hydrophobic alkyl methacrylate copolymers and terpolymers containing various amounts of polymerized methacrylic acid. In each case, the blends were formulated by varying the ratio of polymerized acid monomer to cellulose nitrate so that the total monomer acid content of the final composition was 10 percent. Coating solutions and layers were prepared as in Example 1. The dried films were then examined for appearance and softness after C-41 processing as previously described.

| Polymer | Post-Process Clarity | Softness in Developer |
|---|---|---|
| Poly(ethyl methacrylate-co-methacrylic acid) (85:15) | Excellent | Unaffected |
| Poly(ethyl methacrylate-co-methacrylic acid) (80:20) | Excellent | Unaffected |
| Poly(butyl acrylate-co-methyl methacrylate-co-methacrylic acid) (20:65:15) | Excellent | Unaffected |
| Poly(styrene-co-methyl methacrylate-co-methacrylate acid) (20:65:15) | Excellent | Unaffected |
| Poly(methyl methacrylate-co-2-hydroxyethyl methacrylate-co-methacrylic acid (85:2:13) | Excellent | Unaffected |

The invention has been described in detail with particular reference to preferred embodiments thereof, but it will be understood that variations and modifications can be effected within the spirit and scope of the invention.

We claim:

1. A polymer blend comprising cellulose nitrate and a polymer characterized in that (a) the polymer comprises at east 70 weight percent of polymerized recurring units derived from a hydrophobic monomer selected from the group consisting of styrene, alkyl acrylates and alkyl methacrylates and 10 to 24 weight percent of polymerized recurring units derived from an acid monomer selected from the group consisting of methacrylic acid and acrylic acid; and (b) the blend comprises from 20 to 70 weight percent of cellulose nitrate and from 8 to 15 weight percent of the polymerized recurring acid monomer.

2. The blend of claim 1 wherein (a) the hydrophobic monomer is selected from the group consisting of methyl methacrylate, ethyl acrylate and butyl acrylate; the acid monomer is methacrylic acid; and (b) the blend comprises 9 to 12 weight percent recurring methacrylic acid monomer with the balance being cellulose nitrate.

3. The blend of claim 2 wherein the acrylate polymer is selected from the group consisting of poly(methyl methacrylate-co-methacrylic acid) (weight ratio 90/10);

poly(methyl methacrylate-co-methacrylic acid) (weight ratio 85/15);

poly(methyl methacrylate-co-methacrylic acid) (weight ratio 79/21);

poly(methyl methacrylate-co-methacrylic acid) (weight ratio 75/25);

poly(methyl methacrylate-co-methacrylic acid) (weight ratio 70/30);

poly(ethyl methacrylate-co-methacrylic acid) (weight ratio 80/20);

poly(butyl acrylate-co-methacrylate-co-methacrylic acid) (weight ratio 20/65/15);

poly(styrene-co-methyl methacrylate-co-methacrylic acid) (weight ratio 20/65/15); and poly(methyl methacrylate-co-2-hydroxyethyl methacrylate-co-methacrylic acid) (weight ratio 85/2/13).

4. The blend of claim 1, 2 or 3 wherein the polymeric recurring acid monomer is present in the polymer in amounts of 10 to 20 weight percent.

* * * * *

UNITED STATES PATENT OFFICE

CERTIFICATE OF CORRECTION

PATENT NO. : 4,735,976

DATED : April 5, 1988

INVENTOR(S) : David J. Steklenski et al.

It is certified that error appears in the above-identified patent and that said Letters Patent are hereby corrected as shown below:

Column 8, line 17, the part reading

"at east 70 weight percent"

should read

--at least 70 weight percent--

Column 8, line 47, the part reading

"acrylate-co-methacrylate"

sould read

--acrylate-co-methyl methacrylate--

Signed and Sealed this

Twentieth Day of September, 1988

*Attest:*

DONALD J. QUIGG

*Attesting Officer* *Commissioner of Patents and Trademarks*